United States Patent
Turner et al.

(10) Patent No.: US 7,915,379 B2
(45) Date of Patent: Mar. 29, 2011

(54) EXTRACTION PROCESS UTILZING LIQUIFIED CARBON DIOXIDE

(75) Inventors: Jon R. Turner, Minneapolis, MN (US); Kevin N. West, Mobile, AL (US)

(73) Assignee: Cool Clean Technologies, Inc., Eagan, MN (US)

( * ) Notice: Subject to any disclaimer, the term of this patent is extended or adjusted under 35 U.S.C. 154(b) by 125 days.

(21) Appl. No.: 12/342,068

(22) Filed: Dec. 22, 2008

(65) Prior Publication Data

US 2009/0178693 A1     Jul. 16, 2009

Related U.S. Application Data

(63) Continuation of application No. 11/220,773, filed on Sep. 6, 2005, now Pat. No. 7,478,542, which is a continuation of application No. 10/443,453, filed on May 22, 2003, now Pat. No. 6,938,439.

(51) Int. Cl.
*C08G 65/46* (2006.01)
*C08G 64/00* (2006.01)

(52) U.S. Cl. ........ 528/491; 422/122; 422/311; 424/735; 428/212; 428/213; 528/125; 528/480

(58) Field of Classification Search ............ 422/131, 422/122; 424/735; 428/212, 213; 528/125, 528/480
See application file for complete search history.

(56) References Cited

U.S. PATENT DOCUMENTS

| | | |
|---|---|---|
| 4,379,525 A | 4/1983 | Nowicki et al. |
| 4,543,364 A | 9/1985 | Nankee et al. |
| 4,578,184 A | 3/1986 | Rasmussen |
| 4,680,060 A | 7/1987 | Gupta et al. |
| 4,681,612 A | 7/1987 | O'Brien et al. |
| 4,704,146 A | 11/1987 | Markbreiter et al. |
| 4,714,526 A | 12/1987 | Pennisi et al. |
| 4,746,422 A | 5/1988 | Grimm |
| 4,918,160 A | 4/1990 | Kondoh et al. |
| 4,919,816 A | 4/1990 | Tsao |
| 5,009,745 A | 4/1991 | Hossain et al. |
| 5,013,366 A | 5/1991 | Jackson et al. |
| 5,049,647 A | 9/1991 | Al-Ghatta |
| 5,059,405 A | 10/1991 | Watson et al. |
| 5,073,203 A | 12/1991 | Al-Ghatta |
| 5,080,845 A | 1/1992 | Herrmann et al. |
| 5,110,055 A | 5/1992 | Teeny |
| 5,115,987 A | 5/1992 | Mithal |
| 5,126,058 A | 6/1992 | Beckman |
| 5,148,993 A | 9/1992 | Kashiwagi |
| 5,160,441 A | 11/1992 | Lundquist |
| 5,185,041 A | 2/1993 | Anderson et al. |
| 5,233,021 A | 8/1993 | Sikorski |
| 5,252,614 A | 10/1993 | Sisson |
| 5,258,491 A | 11/1993 | Agreda et al. |
| 5,270,067 A | 12/1993 | Underwood et al. |
| 5,271,773 A | 12/1993 | Hamilton et al. |
| 5,279,615 A | 1/1994 | Mitchell et al. |
| 5,290,505 A | 3/1994 | Huber et al. |
| 5,294,263 A | 3/1994 | Riso |
| 5,304,253 A | 4/1994 | Grant |
| 5,306,350 A | 4/1994 | Hoy et al. |
| 5,316,591 A | 5/1994 | Chao et al. |
| 5,330,581 A | 7/1994 | Syrinek |
| 5,339,844 A | 8/1994 | Stanford |
| 5,370,742 A | 12/1994 | Mitchell et al. |
| 5,401,322 A | 3/1995 | Marshall |
| 5,412,958 A | 5/1995 | Iliff et al. |
| 5,456,759 A | 10/1995 | Stanford, Jr. et al. |
| 5,462,973 A | 10/1995 | Serad et al. |
| 5,467,492 A | 11/1995 | Chao et al. |
| 5,533,538 A | 7/1996 | Marshall |
| 5,558,913 A | 9/1996 | Sasaki et al. |
| 5,642,630 A | 7/1997 | Abdelmalek et al. |
| 5,651,276 A | 7/1997 | Purer et al. |
| 5,669,251 A | 9/1997 | Townsend et al. |
| 5,681,360 A | 10/1997 | Siwajek et al. |
| 5,690,751 A | 11/1997 | Hosel et al. |
| 5,711,820 A | 1/1998 | Smith et al. |
| 5,739,270 A | 4/1998 | Farmer et al. |
| 5,756,657 A | 5/1998 | Sawan et al. |
| 5,780,520 A | 7/1998 | Reeves et al. |
| 5,784,905 A | 7/1998 | Townsend et al. |
| 5,822,818 A | 10/1998 | Chao et al. |
| 5,842,357 A | 12/1998 | Siwajek et al. |
| 5,858,022 A | 1/1999 | Romack et al. |
| 5,858,107 A | 1/1999 | Chao et al. |
| 5,922,668 A | 7/1999 | Leonard et al. |
| 5,925,192 A | 7/1999 | Purer et al. |
| 6,011,087 A | 1/2000 | Marshall et al. |
| 6,039,774 A | 3/2000 | McMullen et al. |
| 6,200,352 B1 | 3/2001 | Romack et al. |
| 6,200,943 B1 | 3/2001 | Romack et al. |
| 6,205,704 B1 | 3/2001 | Schmitz et al. |
| 6,212,916 B1 | 4/2001 | Carr |
| 6,248,136 B1 | 6/2001 | McClain et al. |
| 6,258,766 B1 | 7/2001 | Romack et al. |
| 6,260,390 B1 | 7/2001 | Carr |
| 6,287,640 B1 | 9/2001 | McClain et al. |
| 6,297,206 B2 | 10/2001 | Romack et al. |
| 6,306,222 B1 | 10/2001 | Kim et al. |
| 6,312,528 B1 | 11/2001 | Summerfield et al. |
| 6,369,192 B1 | 4/2002 | Dufresne et al. |

(Continued)

*Primary Examiner* — Terressa M Boykin

(74) *Attorney, Agent, or Firm* — DuFault Law Firm, P.C.; Dustin R. DuFault

(57) ABSTRACT

A method for removing contaminants from synthetic resin material includes contacting a particulate synthetic resin material containing at least one contaminant with a solvent other than carbon dioxide. At least a portion of the contaminant is removed from the particulate synthetic resin material and becomes dispersed in the solvent. The solvent, with the contaminant dispersed therein, is then removed from the particulate synthetic resin material. Thereafter, at least a portion of the solvent still contained on the synthetic resin material is removed by contacting the particulate synthetic resin material with liquid carbon dioxide to dissolve the solvent into the carbon dioxide.

17 Claims, 4 Drawing Sheets

U.S. PATENT DOCUMENTS

| | | |
|---|---|---|
| 6,383,329 B1 | 5/2002 | Agarwala et al. |
| 6,402,857 B2 | 6/2002 | Clark et al. |
| 6,536,059 B2 | 3/2003 | McClain et al. |
| 6,554,005 B1 | 4/2003 | Cords et al. |
| 6,616,770 B2 | 9/2003 | Musha et al. |
| 6,755,871 B2 | 6/2004 | Damaso et al. |
| 6,770,680 B2 | 8/2004 | Klenk |
| 6,919,383 B2 | 7/2005 | Khan et al. |
| 7,253,253 B2 * | 8/2007 | Bohnert et al. ............ 528/480 |
| 7,452,962 B2 * | 11/2008 | Bohnert et al. ............ 528/480 |
| 7,462,685 B2 * | 12/2008 | Bohnert et al. ............ 528/480 |
| 7,470,766 B2 * | 12/2008 | Bohnert et al. ............ 528/480 |
| 2001/0000001 A1 | 3/2001 | Clark et al. |
| 2001/0005812 A1 | 6/2001 | Brookshire et al. |
| 2002/0033550 A1 | 3/2002 | Suehara |
| 2002/0045730 A1 | 4/2002 | Yanagida |
| 2002/0048629 A1 | 4/2002 | Romack et al. |
| 2002/0169223 A1 | 11/2002 | Khan et al. |
| 2002/0189644 A1 | 12/2002 | Wack |
| 2003/0053865 A1 | 3/2003 | Ianniello et al. |
| 2003/0199596 A1 | 10/2003 | Koike et al. |
| 2003/0213747 A1 | 11/2003 | Carbonell et al. |
| 2007/0228600 A1 * | 10/2007 | Bohnert et al. ............ 264/238 |

* cited by examiner

EXTRACTION PROCESS UTILZING LIQUIFIED CARBON DIOXIDE

CROSS-REFERENCE TO RELATED APPLICATION(S)

This application is a continuation of U.S. application Ser. No. 11/220,773, filed on 6 Sep. 2005, which was a continuation of U.S. application Ser. No. 10/443,453, filed on 22 May 2003, now U.S. Pat. No. 6,938,439, each of which are hereby incorporated herein by reference.

BACKGROUND OF INVENTION

The present invention relates to a cleaning solution based on gas-expanded liquids. More particularly, the present invention relates polar organic solvents whose solubility characteristics are modulated through the use of liquid carbon dioxide.

In the twenty first century, the recovery, recycle and reuse of post-consumer plastic containers is an active area of interest for both the public and private sectors. Each year millions of pounds of plastic are used to produce injection-molded containers for the aforementioned products. Disposal of these plastic containers in municipal landfills is undesirable as the plastic may be contaminated with environmental pollutants, such as pesticides or hydrocarbons. Such plastics include, but are not limited to, polyethylene, polyethylene terephthalate (PET) and polyvinyl chloride (PVC). In many communities, these plastic containers are separated from refuse by consumers and are collected by recycling centers to be reprocessed into new forms. Additionally, the disposal of these materials is a waste of a potential secondary raw material.

Certain classes of polymeric materials are presently recycled in commercial systems relying in great part on collection of polymeric containers from residential and commercial sites. This system is complicated in that associated wastes with differing sources of polymeric materials may not be amenable to a single format of treatment. Although local jurisdictions may require some level of cleaning of the polymeric containers, the original liquids or powders may be insufficiently removed from the polymer. These materials may vary from water, beverages, detergents, oils, alkaline cleaners, and highly toxic materials, including pesticides. In addition, the containers may contain labels that are applied by adhesives of different strengths, and the label stock itself may need to be treated by distinct processes. A single cleaning process has been unlikely to act on all polymeric containers, at least in part because of the deficiencies in the cleaning steps that fail to provide a sufficiently pure supply of polymer that would enable direct recycling.

In order to processes these post-consumer materials, cleaning of the plastic must render a product free of any initial use contaminants. This involves the removal of a variety of surface contaminants which may include motor oil, food or beverage products, pesticides, cosmetics and detergents. Additionally, the solvent must be able to swell and dissolve labeling adhesives that remain from the initial use of the plastics. Current water based cleaning systems are unable to economically process the full spectrum of these contaminants in an environmentally responsible manner.

The variety of contaminants that remain on the refuse plastic pose a particularly challenging problem for a facility that wishes to collect and clean plastics from all sources. In some cases, such as motor oil bottles that are collected at commercial facilities, the plastic may be obtained with a single class of contaminant. However, for plastic that is segregated from household or generic commercial refuse, the mixture of contaminants poses a challenge when selecting a solvent. In either case, it is desirable to have a simple solvent system that is capable of removing any contaminant that may be encountered as well as any labeling and adhesives. Broad-spectrum solvents, such as acetone and methylene chloride, provide a thermodynamic solution to this dilemma; yet, these solvents are not environmentally acceptable. Currently, much of the cleaning is done with water-based systems. While the use of surfactants can make this an effective process, large wastewater streams are produced which contain the contaminant species.

Recycling of motor oil containers is illustrative of the problem. Motor oil containers typically are high-density polyethylene (HDPE) which lends itself well to recycling if it is sufficiently clean. However, residual oil coating the interior surface of the "empty" motor oil containers constitutes a contaminant that prevents use of the containers as high grade plastics. Based upon measurement of samples of used motor oil containers, this residual oil coating appears to average 4.6 percent of the weight of the used plastic container and can represent as much as 20 percent of the container weight. Estimates are that over one billion one-quart plastic containers were filled with motor oils in the United States in 1993. If 4.6 percent by weight of those containers is motor oil, the one billion empty plastic containers represent approximately 160 million pounds of plastic and over 7 million pounds of motor oil that could be recovered for reuse if an appropriate separation method were available. However, because the motor oils have not been easily separated from the plastic containers, the vast majority of these containers are currently disposed of in landfills, leaking oils into the soil and groundwater, and occupying significant landfill volume.

Ideally, pure liquid or supercritical carbon dioxide would be the best choice for a sustainable solvent. However, the solvent power of $CO_2$ is too poor to sufficiently dissolve many of the adhesives and contaminant species encountered. Thus a more polar solvent must be employed, and preferably an environmentally benign polar solvent to maintain the environmental benefits. However, such polar solvents ideal for this application have low volatilities, making them difficult to remove or evaporate from cleaned substrates.

BRIEF SUMMARY OF THE INVENTION

The present invention includes a four stage process of extracting contaminants from a substrate. The first stage includes an initial liquid carbon dioxide wash. This wash is used to remove liquid organics, including oils, from the surface of the substrate. The liquid carbon dioxide may also remove some particulate matter such as labels, or alternatively, prepares for the removal of the particulate matter in later stages. The second stage includes a polar solvent wash utilizing a low volatility solvent. The polar, low volatility solvent removes polar components, including salts and adhesives, along with the particulate matter. Preferable low volatility solvents include, but are not limited to, d-limonene, ethyl lactate, propylene glycol, ethylene carbonate, propylene carbonate, or any combination thereof. Upon washing the substrate with the polar solvent, many contaminants will be removed, however, a slight residual film of the solvent typically remains. The third stage includes a liquid carbon dioxide rinse. The substrate is rinsed with liquid carbon dioxide to remove residual polar solvent, along with any remaining particulate matter. Upon rinsing the substrate with the liquid carbon dioxide, the vessel is drained and the pressure brought back to near atmospheric conditions, leaving the substrate free of contaminants, polar solvent and carbon dioxide. The fourth stage includes purification of the polar solvent. Since the initial wash removed all components soluble in carbon dioxide, the solutes in the low volatility solvents can be precipitated out of solution by adding liquid carbon dioxide to the solvent as an anti-solvent crystallizer, with the precipitate separated through filtration processes. The liquid carbon dioxide may then be purified by flash vaporization.

DETAILED DESCRIPTION

Figure 1:
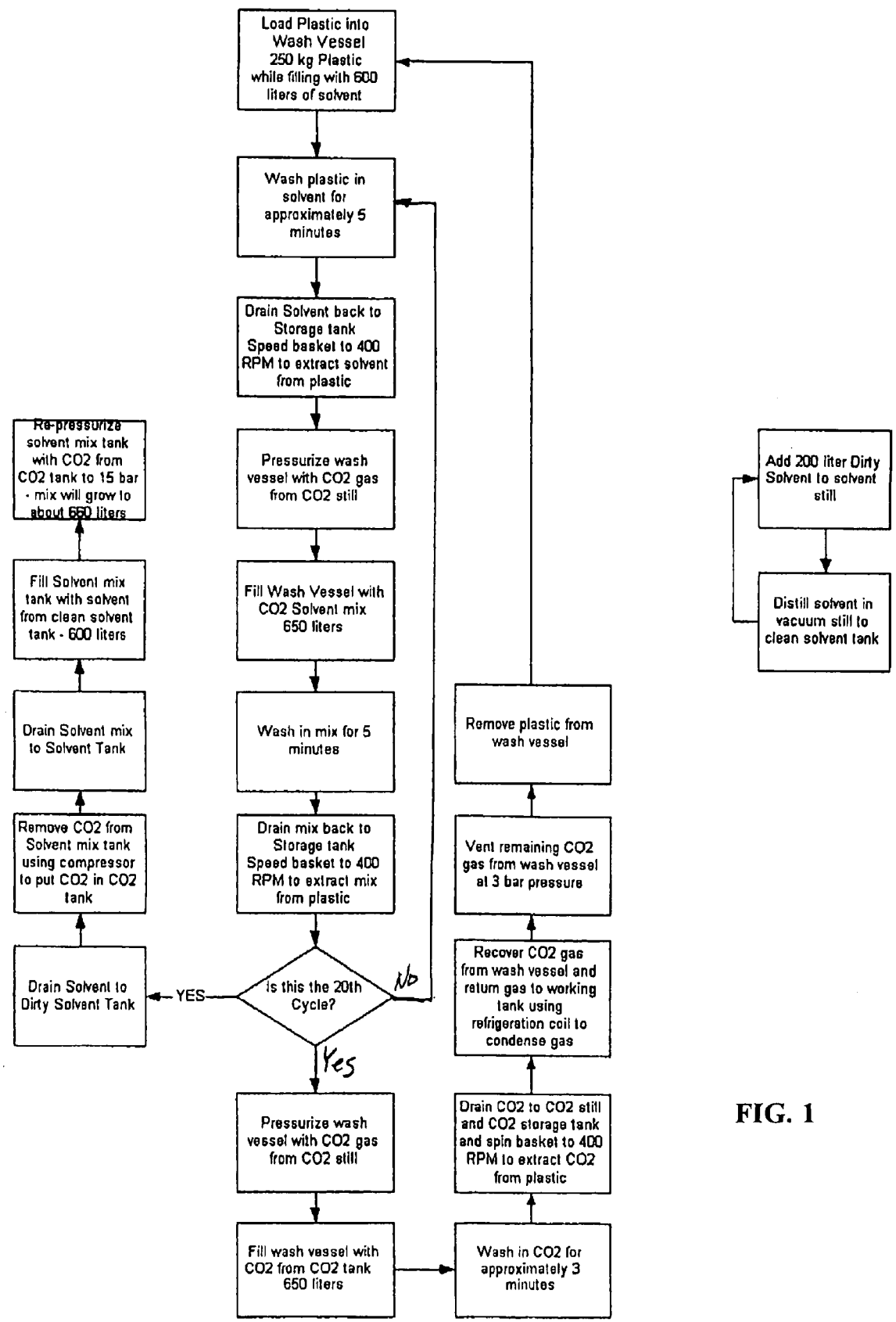
FIG. 1 is a flow diagram of a process of the present invention.

Gas-expanded liquids are mixtures of a liquid solvent with carbon dioxide. The liquid may be a polar or non-polar organic solvent, a silicone or a fluorocarbon. Such solutions have the advantage of complete tunability of solvent properties, coupled with facile downstream separations. In the preferred embodiment of the present invention, the liquid solvent is ethyl lactate, limonene or a mixture thereof.

$CO_2$ at moderate pressures (30 to 80 bar) has a considerable solubility in many organic solvents, including alcohols, ketones, ethers and esters. Liquids with a significant amount of dissolved $CO_2$ are referred to as gas-expanded liquids.

The ability to vary the liquid phase concentration by adjusting the pressure and the low solvent strength of $CO_2$ allows for fine-tuning the solvent power of the solution. As the pressure is increased, the $CO_2$ concentration in the liquid increases and the solvent power is lowered. This, like the pressure/temperature tunability of supercritical $CO_2$, enables the adjustment of physicochemical properties, such as solubility. If the organic liquid is polar, then a range of solutes, either highly polar or nonpolar, may be dissolved dependent upon the amount of $CO_2$ in the liquid phase.

The ability to tune the properties of this mixed solvent system gives it versatility practically unattainable with a single solvent. The use of $CO_2$ as a co-solvent is advantageous because of the facile separation. In a traditional mixed solvent, downstream separation often requires distillation, which is capital and energy intensive. In $CO_2$-expanded liquids, the $CO_2$ is easily removed from the solution by simple depressurization. Another advantage of gas-expanded liquids is the ability of $CO_2$ to improve the mass transfer properties of the liquid. Adding carbon dioxide to the solvent can significantly decrease its viscosity. This is a paramount concern when removing the solvent from the substrate.

In preliminary testing, washing plastic in pure ethyl lactate leaves a solvent residue behind which is not observed when $CO_2$-expanded ethyl lactate is used or when the substrate is rinsed afterward with pure liquid $CO_2$. The inspection was made by sight, touch and smell. There was no apparent residue of ethyl lactate on the plastic, and only a slight odor. Also, the expanded liquid should have higher diffusivities than the pure solvent. This will aid in faster dissolution of contaminants and may help to swell and dissolve the polymer adhesives more rapidly, resulting in shorter processing times.

A third benefit of employing a $CO_2$-expanded liquid system is the ability to increase the pressure and affect separation of the contaminants and adhesives from the expanded liquid. By increasing the pressure up to the saturation pressure of $CO_2$, the solvent power is lowered; as the solvent power decreases, so will the solubility of the most dissolved compounds. When a critical amount of $CO_2$ has been added, the adhesives and contaminants will fall out of solution and phase separate. When the solutes crystallize out as a solid, this is known as gas anti-solvent crystallization; when a second condensed phase appears as a liquid, it is simple liquid-liquid immiscibility. Once this occurs, the extracted compounds may be removed from the solvent mixture by decantation, filtration or other suitable separation. The type of filtration used will depend upon several factors including, but not limited to, degree of supersaturation, rate of carbon dioxide addition, and the particular solute being precipitated. Additionally, course particles can be filtered while a liquid-liquid separation may have to be decanted. The organic solvent and $CO_2$ are then easily recovered. We have observed the liquid-liquid separation of adhesive material from a mixture of $CO_2$ and ethyl lactate at pressures as low as 30 bar.

Thus the versatility of this solvent system, the ease of separation and the environmentally benignity of carbon dioxide imply a robust environmentally responsible solvent system for substrate cleaning. However, this is only possible if the liquid is also environmentally benign.

Being both nontoxic and biodegradable, ethyl lactate fits into a narrow category of organic solvents whose use is environmentally responsible. By environmentally responsible it is meant that the solvents have minimal environmental impact, such as low toxicity and a short environmental lifetime. Ethyl lactate is also an excellent candidate for a polar organic solvent to be coupled with $CO_2$. Additionally, the production of ethyl lactate is environmentally acceptable, as it is manufactured biochemically from feedstocks, such as starches. In fact, ethyl lactate is so benign that the FDA has approved its use in foods. Although it has been considered a safe alternative for many years, it is only recently that efficient synthesis and separation methods have made it possible to produce ethyl lactate for approximately $1 per pound, which is competitive with traditional organic solvents. Currently, ethyl lactate is available in bulk from a number of manufacturers, including Vertec Biosolvents and Cargill Dow. The utility of ethyl lactate is greatly broadened by combining it with $CO_2$ in a gas-expanded liquid.

In addition to being environmentally benign, ethyl lactate also has a high $CO_2$ solubility at modest pressures. It is known that $CO_2$ is highly soluble in esters, as esters are considered a "$CO_2$-phillic" group, due to a Lewis acid/base interaction between the partial positive quadupole of $CO_2$ and the partial negative dipole on the carbonyl oxygen of the ester.

Experiments were conducted on industrial samples of contaminated plastic chips with $CO_2$-expanded ethyl lactate to determine the effectiveness of such a wash. In order to provide agitation to enhance cleaning, a $CO_2$ dry cleaning machine was used, such as those fully described in U.S. Pat. Nos. 5,904,737, 6,216,302, 6,257,282, 6,349,947, and 6,442,980, all of which are hereby incorporated by reference. Before the chips were placed in the machine, they were centrifuged to remove excess surface material, a step which would be done in a commercial process. The plastic chips were washed in the mixture for several minutes and briefly rinsed with liquid $CO_2$ afterwards. The chips were then run through a commercial hopper to separate the plastic from labeling material. Initial testing utilizing the $CO_2$ dry cleaning machine indicated excellent performance of $CO_2$-expanded ethyl lactate as a cleaning solvent for refuse plastic. Chipped plastic from oil bottles, beverage bottles and milk bottles was sufficiently cleaned such that no residue remained on the chips after a single wash cycle.

In the case of the motor oil bottles, a mixture of ethyl lactate and limonene (another environmentally benign solvent) was used as the liquid solvent to solubilize the oil. Preferably, a mixture of 70% ethylene lactate and 30% limonene is utilized in the present inventive process. However, it should be noted that other mixtures of the ethylene lactate and limonene are within the scope of the present invention, ranging from a 100% ethylene lactate mixture to a 100% limonene mixture, and an infinite number of mixtures of the two therebetween, including a mixture of 75% ethylene lactate and 25% limonene, and a mixture of 25% ethyl lactate and 75% limonene. After washing in the mixed solvent, the chips retained no indication of their former contamination, including adhesives, coverage or odors. The odor of ethyl lactate was present for some plastics, however, this should be eliminated with additional $CO_2$ washes.

FIG. 1 is a flow diagram illustrating an exemplary batch process of the present invention for removing and/or extracting motor oil from plastic containers. Used bottles of motor oil are collected from the appropriate facilities, and then cut or shredded to form small chips of plastic. The average preferred size of the plastic chips is about six to seven millimeters in diameter. This allows for a sufficient packing ratio and is not too small to cause problems with filtration. Larger diameter chips tend to bridge easily, which in turns makes it difficult to transfer the chips through a vacuum system, preventing decent packing of the chips as well. The plastic chips are loaded into a suitable wash vessel, along with a solvent. The solvent may be ethyl lactate, d-limonene or a mixture thereof as described. The solvent and chips are agitated for a sufficient amount of time, preferably about 5 minutes, such that the motor oil deposited on the chips can solubilize into the solvent. After agitation, the solvent/oil mixture is removed from the chips by centrifugal force and drained from the vessel to be further processed to extract the motor oil from the solvent. Extraction may be done by distillation or through expanding the solvent. Expanding the solvent results in the oil precipitating from solution. Alternatively, when utilizing distillation techniques, a single distillation system employing vacuum stills, such as manufactured by Recycling Sciences, Inc., is preferable.

Upon draining the solvent mixture from the vessel, the vessel is pressurized with carbon dioxide. Pressure within the vessel is increased until the carbon dioxide liquefies. Further liquified carbon dioxide is added, preferably about 650 liters. It should be noted, however, that this amount is dependent upon the size of the washing vessel. The plastic chips and liquified carbon dioxide are agitated for a sufficient amount of time, preferably about 5 minutes, at about 400 RPM, such that any remaining solvent/oil mixture which was not removed during the solvent wash solubilizes into the liquid carbon dioxide. The vessel is then spun and drained of the liquid carbon dioxide, along with the polar solvent and contaminants, which are directed to an attached storage tank. If there still remains an appreciable amount of contaminant on the surface of the chips, the solvent is again added and the process repeated.

After extracting a preferred amount of contaminants from the plastic chips, preferably after about twenty cycles, the plastic chips are finally rinsed with a fresh batch of carbon dioxide. As before, the vessel is pressurized with carbon dioxide gas, and pressurization increases until liquefaction of the carbon dioxide. Liquid carbon dioxide is further added until the vessel contains approximately 650 liters. The plastic chips are agitated and rinsed for approximately three minutes. After the rinse, the vessel is spun, with the liquid carbon dioxide draining to a storage tank. The pressure in the vessel is then decreased, resulting in the remaining liquid carbon dioxide transitioning into the gaseous state, leaving the plastic chips virtually free of contaminants, solvent or carbon dioxide. The pressure within the chamber is further reduced to approximately 3 bar, and the remaining carbon dioxide gas is recovered. The plastic chips are then removed from the vessel for further processing.

Additionally, after the preferred amount of contaminants have been removed from the plastic chips, the solvent containing the contaminants therein are drained to a "dirty" solvent tank. The temperature and/or pressure of the "dirty" solvent tank is adjusted to separate the solvent from the liquid carbon dioxide. Upon separation, the carbon dioxide is transferred to a separate tank, and the solvent mixture is distilled to extract the contaminants. Upon distillation, the solvent is returned to the solvent tank and may be used in other batch processes. Table 1 lists parameters and results of an experiment utilizing the process of the present invention.

TABLE 1

| | |
|---|---|
| Wt. of Oily Plastic (lb.) | 90.9 |
| Wt. of Centrifuged Plastic (lb.) | 78.7 |
| Wt. of Plastic after Lim. (lb.) | 77.25 |
| Wt. of Plastic after CO2 (lb.) | 76.05 |
| Oil extracted by centrifuge (lb.) | 12.2 |
| % extraction in centrifuge | 16.04% |
| Oil extracted by Lim (lb.) | 1.45 |
| % extraction in lim | 1.91% |
| Oil extracted in CO2 (lb.) | 1.2 |
| % extracted in CO2 | 1.58% |

An alternative embodiment of the present invention includes a four stage process of extracting contaminants from a substrate. The first stage includes an initial liquid carbon dioxide wash. This wash is used to remove liquid organics, including oils, from the surface of the substrate. The liquid carbon dioxide may also remove some particulate matter such as labels, or alternatively, prepares for the removal of the particulate matter in later stages.

The second stage includes a polar solvent wash utilizing a low volatility solvent. The polar, low volatility solvent removes polar components, including salts and adhesives, along with the particulate matter. Preferable low volatility solvents include, but are not limited to, d-limonene, ethyl lactate, propylene glycol, ethylene carbonate, propylene carbonate, or any combination thereof. Upon washing the substrate with the polar solvent, many contaminants will be removed, however, a slight residual film of the solvent typically remains.

The third stage includes a liquid carbon dioxide rinse. The substrate is rinsed with liquid carbon dioxide to remove residual polar solvent, along with any remaining particulate matter. Upon rinsing the substrate with the liquid carbon dioxide, the vessel is drained and the pressure brought back to near atmospheric conditions, leaving the substrate free of contaminants, polar solvent and carbon dioxide.

The fourth stage includes purification of the polar solvent. Since the initial wash removed all components soluble in carbon dioxide, the solutes in the low volatility solvents can be precipitated out of solution by adding liquid carbon dioxide to the solvent as an anti-solvent crystallizer, with the precipitate separated through filtration processes. The liquid carbon dioxide may then be purified by flash vaporization.

Figure 2:
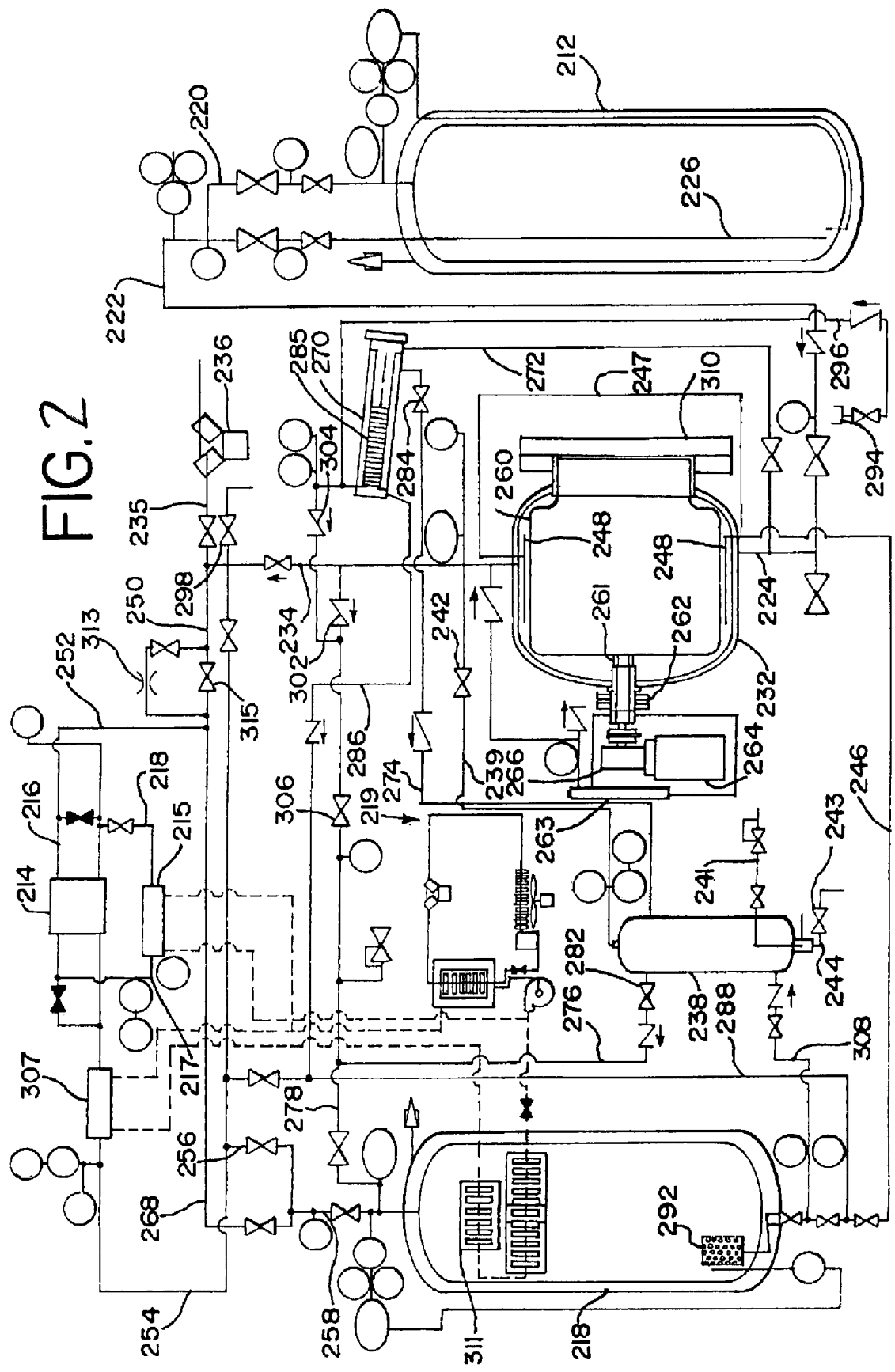
FIG. 2 is a schematic diagram of an embodiment of a carbon dioxide dry cleaning system of the present invention.

In FIG. 2, a third embodiment of the carbon dioxide dry cleaning system of the present invention is shown. A cold transfer tank 212 contains a supply of liquid carbon dioxide, preferably with cleansing additives, at a pressure of about 200 to 50 psi. Transfer tank 212 may be refilled from a mobile delivery tank in a conventional manner.

A cleaning or wash chamber 232 contains soiled garments and has a volume less than that of a storage tank 218. To commence the dry cleaning process, most of the air in chamber 232 must be evacuated to prevent the addition of water to the cleaning fluid. This is accomplished through line 234 and vacuum compressor 236.

Chamber 232 is then pressurized to an intermediate pressure of approximately 70 psi by communication with the head space of external still 238 which, as will be explained below, contains carbon dioxide vapor at a pressure of approximately 800 psi. The head space of still 238 and the wash chamber 232 communicate via lines 239 and 234. A steam supply line 241 is in communication with a source of steam (not shown) and the still 238. As a result, heat is supplied to the still so that its pressure may be increased back to approximately 800 psi after vapor is transferred to the wash chamber 232. Alternative forms of heating the still, such as an electric blanket or heater, may alternatively be used. Wash chamber 232 may alternatively be pressurized to an intermediate pressure by communication with the head space of transfer tank 212 via lines 220, 222 and 224.

Once chamber 232 is pressurized to an intermediate pressure, liquid carbon dioxide may be transferred thereto from transfer tank 212 via dip tube 226 and lines 222 and 224 to make up for liquid carbon dioxide lost during previous cycles.

After the system is replenished with liquid carbon dioxide, the head space of still 238 is once again placed in communication with chamber 232 via lines 239 and 234. The resulting reduction in pressure in still 238 causes the liquid carbon dioxide therein to boil so that nearly no liquid remains and vapor is transferred to the chamber 232 until the pressures within the two equalize at approximately 420 psi. This procedure allows chamber 232 to be pressurized without lowering the temperature or pressure of the fluid stored in storage tank 218. The steam supply line 241 may be operated to assist in vaporizing all of the liquid within still 238. Once chamber 232 is pressurized, valve 242 is closed to isolate still 238 from chamber 232.

The residue of soluble contaminants, such as soils and dyes, collect in the bottom of the still 238 as the liquid carbon dioxide therein boils. This residue may removed by periodically opening valve 243 after all of the liquid has been transferred to the chamber. The pressure within the still forces the residue out of line 244 when valve 243 is opened.

Chamber 232 next is partially filled with a quantity of liquid carbon dioxide that is slightly less than the capacity of still 238. As an example only, still 238 may have a capacity of approximately 17 gallons. This partial fill of the chamber 232, which is done in preparation for the prewash cycle, is done in two steps: the gentle step and the vigorous step. During the gentle step, the liquid side of storage tank 218 is placed in communication with the interior of chamber 232 via lines 246 and 247 and nozzles 248. The pressure difference between tank 218 and chamber 232 then causes the liquid carbon dioxide to flow to the latter.

The prewash fill is completed during the vigorous step by connecting chamber 232 to the suction side of a compressor 214 via lines 234, 250 and 252 and the discharge side to the head space of storage tank 218 via lines 254, 256 and 258. This allows gas to be extracted from chamber 232 and storage tank 218 to be pressurized. The resulting pressure difference causes liquid carbon dioxide to flow from storage tank 218 to chamber 232 through lines 246 and 247 and nozzles 248. The flow of liquid carbon dioxide into chamber 232 through nozzles 248 agitates the garments or other objects in chamber 232 such that insoluble soils are removed. Upon completion of the prewash fill, chamber 232 is contains liquid carbon dioxide at a pressure of about 650 to 690 psi and a temperature of about 54° F. (a temperature at which it is an effective solvent).

To provide a greater variety and more accurate pressurization, compressor 214 may optionally be a two-stage compressor. Gas travels to the inlet of the first stage of compressor 214 through line 216. If second stage compression is desired, gas exiting the first stage is directed through line 217 where heat exchanger 215 is encountered. Heat exchanger 215 allows the gas traveling to the second stage of the compressor to be cooled or heated if necessary. Line 218 carries the gas from the heat exchanger 215 to the inlet of the second stage of the compressor. Gas ultimately exits the compressor through line 254. The temperature of heat exchanger 215 may be controlled via a connection with a refrigeration circuit, indicated in general at 219.

A basket 260 is rotatably mounted within chamber 232 via a shaft 261 that is supported by a bearing cartridge 262. Preferably, the bearing cartridge 262 includes a leak detection and management system 263 as described in commonly assigned U.S. Pat. No. 6,474,115. A motor 264 is activated to turn the rotating basket 260 via a drive mechanism 266 so that the garments may undergo further agitation so that additional insoluble soils are removed therefrom. Suitable drive mechanisms 266 are known in the art and include gear, shaft, belt and chain arrangements. During the prewash cycle, the rotating basket preferably is operated at a speed of approximately thirty revolutions per minute for approximately one minute.

After the prewash cycle, the suction side of compressor 214 is connected to the head space of still 238 via lines 276, 278, 258, 268 and 252. The discharge side of compressor 214 is connected to chamber 232 via lines 254 and 234. The bottom of chamber 232 is connected to the inlet side of a filter 270 by lines 224 and 272. A filter bypass line 274 runs from the inlet side of the filter to the head space of still 238. Upon operation of compressor 214, all of the liquid carbon dioxide in chamber 232 is transferred to still 238 in an unfiltered condition. As a result, still 238 contains liquid carbon dioxide at a pressure of approximately 700 psi and drained chamber 232 is at a pressure of approximately 700 psi.

After the chamber 232 has been drained, still 238 is isolated from the head space of storage tank 218 and filter 270 through closure of valves 282 and 284, respectively. As will be explained below, carbon dioxide gas is introduced into still 238 during the chamber pressure reduction cycle to bring the pressure therein up to approximately 800 psi. As a result, still 238 is prepared for use and distillation during the prewash cycle for the next load of garments to be cleaned.

The first wash cycle is initiated by again connecting chamber 232 to the suction side of compressor 214 and the discharge side of the compressor to the head space of the storage tank 218. The bottom of storage tank 218 is placed in communication with wash chamber 232 via lines 246 and 247 and nozzles 248. Upon activation of the compressor, the garments within chamber 232 are agitated via nozzles 248 as the chamber is refilled to a level of approximately one-half to two-thirds full with liquid carbon dioxide at a pressure of about 650 to 690 psi and a temperature of about 54° F. The basket 260 is again rotated to agitate the garments therein further at a speed of, for example, thirty revolutions per minute. Preferably, the basket rotation/agitation occurs for a period of roughly four minutes.

Upon completion of the first wash cycle, the suction and discharge sides of compressor 214 are again connected to the head spaces of storage tank 218 and chamber 232, respectively. The bottom of chamber 232 is placed in communication with the inlet side of filter 270. Valve 284 in bypass line 274 remains closed. As a result, all of the liquid from the chamber 232 is directed through the filter 270 and the charcoal bed 285 positioned therein. The charcoal bed 285 removes dyes and odors from the liquid carbon dioxide. The filtered liquid carbon dioxide exits the filter outlet side and travels to the bottom of storage tank 218 via lines 286, 288 and 246. A diffuser 292 is used to disperse the filtered liquid as it rejoins the liquid remaining in tank 218.

A detergent dispenser 294 communicates with the outlet side of filter 270 via line 296. As liquid carbon dioxide drained from chamber 232 passes through filter 270, a venturi effect causes detergent to be withdrawn from dispenser 294. This detergent travels through line 296 and is added to the stream of liquid carbon dioxide exiting filter 270. The injection of detergent, or other additives such as softeners, downstream of filter 270 allows for complete mixing of the detergent and liquid carbon dioxide as it travels towards and into storage tank 218.

Four additional wash cycles of the type described above preferably are performed. No detergent is added, however, during the drain of liquid carbon dioxide from the wash chamber after the fourth/last wash cycle.

During one or more of the wash cycles, an operation whereby the liquid carbon dioxide in chamber 232 is warmed may optionally be performed. This warming operation is performed during the agitation stage of a wash cycle. The head space of tank 218 is connected to the suction side of compressor 214 via lines 258, 268 and 252. The discharge side of compressor 214 is connected to the nozzles 248 of wash chamber 232 via lines 254, 288, 246 and 247. With the system placed in this configuration, operation of the compressor reduces the pressure within tank 218 so that the liquid therein boils. The vapor produced thereby is withdrawn from tank 218 by compressor 214 and introduced into chamber 232 through nozzles 248. As a result, the liquid carbon dioxide within chamber 232 is pressurized to approximately 840 psi and warmed to approximately 70° F. At this temperature and pressure, the solvent properties of the liquid carbon dioxide and detergent within chamber 232 are enhanced.

An added benefit of the warming operation is that the temperature and pressure of the liquid carbon dioxide remaining in tank 218 are both decreased. This compensates for the return of the warm solvent gas from chamber 232 during the drainage stage of the wash cycle. In other words, the warming of the liquid in chamber 232 is offset by the cooling of the liquid within tank 218 so that the overall system temperature remains balanced.

In the event of a system malfunction during the wash cycle, the valves leading to and from the wash chamber 232 may be closed. If this occurs when the wash chamber is nearly full of liquid carbon dioxide, the pressure therein could build very rapidly. The system is equipped with a main pressure relief valve 298 that permits the chamber to vent to the exterior of the plant that houses the system. The main pressure relief valve 298 opens when the pressure within the wash chamber 232 reaches 1000 psi. This produces a very loud and unnerving sound, however.

In order to maintain protection from over-pressurization of the wash chamber, but to prevent the activation of the main pressure relief valve, the system is provided with a pressure relief valve, such as spring-loaded check valve 302, that is positioned within line 278. Line 278, when check valve 302 is open, permits solvent to flow from the head space of chamber 232 to the head space of supply tank 218. The system also includes a pressure relief valve, such as spring-loaded check valve 304, that is positioned in circuit between the outlet side of filter 270 and the line 278 leading to the head space of supply tank 218. Spring-loaded check valve 304 prevents over-pressurization of filter 270 due to liquid carbon dioxide that may trapped therein.

Both spring-loaded check valves 302 and 304 are set to open when the pressures on their inlet (chamber and filter, respectively) sides become approximately 100 psi higher than the pressure on their outlet/supply tank sides. Given that the pressure in supply tank 218 is approximately 700 psi, the spring-loaded check valves 302 and 304 limit the pressures in the chamber and filter, respectively, to approximately 800 psi. As such, both check valves 302 and 304 will operate before main pressure relief valve 298.

As described above, during the warming operation that may optionally be performed during the agitation stage of a wash cycle, the pressure of the liquid carbon dioxide within the chamber 232 may be increased to 840 psi. Accordingly, when the optional warming operation is performed, check valve 302 must be disabled so that it does not open. This may be accomplished by closing valve 306 in line 278.

After the last wash cycle, two rinse cycles are performed using the same procedure except that agitation is performed only for approximately one minute during each of the rinse cycles and no detergent is added during drainage of the wash chamber.

A heat exchanger 307 communicates with the outlet of compressor 214 and is heated by gas exiting the compressor during the liquid fills of chamber 232. As a result, the gas traveling to storage tank 218 is cooled to minimize the undesired heating of the liquid carbon dioxide stored therein.

After the second rinse cycle, the wash chamber 232 is at a pressure of approximately 650 psi and is empty of carbon dioxide liquid, except for a small amount trapped between the fibers of the garments. The remaining liquid in the garments is removed by a spin cycle during which the basket 260 containing the garments preferably is rotated at approximately 180 rpm for approximately two minutes.

The head space of supply tank 218 is again connected to the suction side of compressor 214 while the discharge side of the compressor is connected to the head space of chamber 232. The bottom of chamber 232 is connected to the bottom/liquid side of tank 218 with filter 270 in circuit there between. As a result, operation of compressor 214 forces the liquid removed from the garments out of chamber 232, through filter 270 and to tank 218.

The system is configured to recirculate the gas within chamber 232 and warm its interior and contents by connecting the head space of the chamber to the suction side of compressor 214. The discharge side of compressor 214 is connected to the nozzles 248 of the chamber via lines 254, 288, 246 and 247. Operation of compressor causes gas to be withdrawn from chamber 232 and directed to the heat exchanger 307 where it is warmed. The warmed gas is then delivered into the chamber through the nozzles so that the garments within the chamber are "fluffed." The basket 260 within the chamber may optionally be rotated so that the fluffing of the garments is enhanced. The gas recirculation/fluffing cycle preferably is performed for approximately two minutes.

The gas recirculation/fluffing cycle may optionally be enhanced by providing a flow restrictor such as orifice 313. As illustrated in FIG. 2, flow restrictor 313 may be placed in parallel with valve 315 so that valve 315 may be closed to force gas through the restrictor. With the system of FIG. 2 thus configured, gas withdrawn from chamber 232 encounters the flow restrictor 313 prior to entering compressor 214. As a result, compressor 214 must work harder to circulate the gas. This causes the compression ratio between the gas entering the compressor and that leaving the compressor to be high enough that the temperature of the gas is raised significantly. Accordingly, warmer gas is delivered to the chamber 232 for enhanced fluffing. The decompression that occurs across the flow restrictor 313 cools the gas slightly as it travels there through. Heat exchanger 215 may be used to warm the gas slightly as is travels to the second stage of the compressor to offset the temperature decrease across flow restrictor 313.

The pressure within chamber 232 must be decreased to atmospheric before the cleaned garments may be removed. This is accomplished by connecting the head space of chamber 232 to the suction side of compressor 214 and the discharge side of the compressor to the liquid side of still 238 via lines 254, 288, 246 and 308. The compressor then withdraws gas from chamber 232 and delivers it to still 238 until the pressure within the latter is raised to approximately 800 psi. The carbon dioxide gas from the compressor is then redirected to the liquid side of tank 218 and diffuser 292. As a result, the carbon dioxide gas from chamber 232 is bubbled into the liquid carbon dioxide of tank 218 until the pressure within tank 218 is increased to approximately 650 to 690 psi.

After chamber 232 is depressurized, the pressure therein is approximately 50 to 60 psi. This remaining pressure may be safely vented to the atmosphere via lines 234 and 235. The chamber door 310 may then be safely opened and the garments removed.

Figure 3:
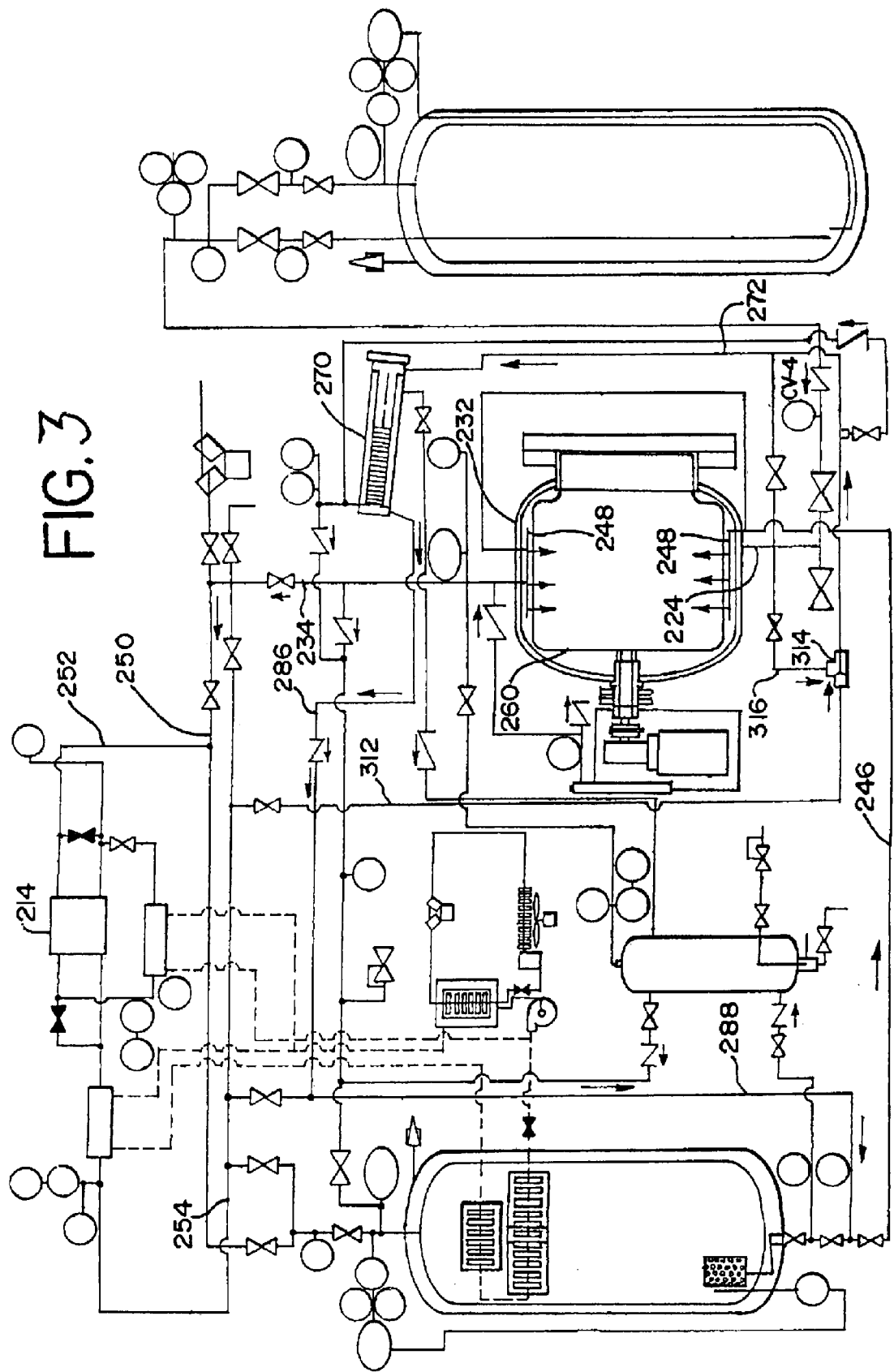
FIG. 3 is a schematic diagram of a first alternative embodiment of a carbon dioxide dry cleaning system of the present invention.

FIG. 3 illustrates the system of FIG. 2 with the addition of components that allow for constant filtration of the liquid carbon dioxide during the wash cycle. More specifically, a line 312 has been added between lines 254 and 272. A venturi or eductor 314 is positioned within line 312 and communicates with line 224 via line 316.

As described previously, during the wash cycle, wash chamber 232 is approximately one-half to two-thirds full with liquid carbon dioxide at a pressure of about 650 to 690 psi and a temperature of about 54° F. The basket 260 is rotated to agitate the garments therein. To provide constant filtration of the liquid carbon dioxide therein, the top of chamber 232 is connected via lines 234, 250 and 252 to the suction side of compressor 214 while the discharge side of compressor 214 is placed in communication with lines 254 and 312. As a result, gas is withdrawn from the head space of chamber 232 and is directed through eductor 314.

Liquid carbon dioxide is withdrawn from the bottom of chamber 232 via lines 224 and 316 and mixes with the carbon dioxide gas flowing through eductor 314. The liquid, propelled by the flow of liquid carbon dioxide gas, travels to filter 270 via line 272. The filtered liquid travels through lines 286, 288 and 246 to nozzles 248 whereby it is reintroduced into chamber 232.

Figure 4:
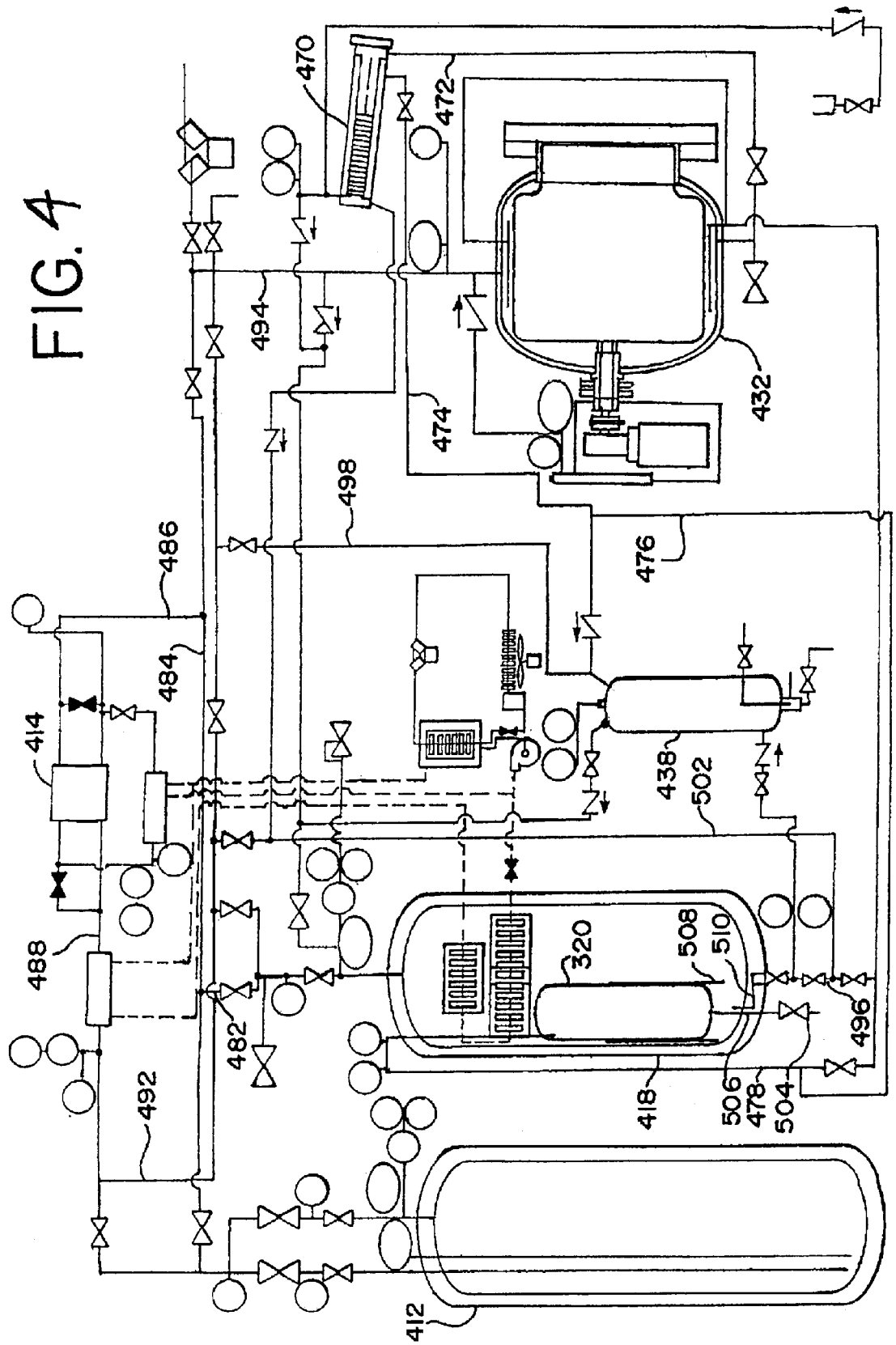
FIG. 4 is a schematic diagram of a second alternative embodiment of a carbon dioxide dry cleaning system of the present invention.

Another embodiment of the system of the present invention is illustrated in FIG. 4. This embodiment includes generally all of the components of the embodiment of FIG. 2 with the addition of a still 320 positioned within the storage tank 418. The system of FIG. 4 operates in the same manner as the system of FIG. 2 with the exception that after the second/last rinse cycle, the liquid carbon dioxide drained from the wash chamber 432 is directed to the internal still 320.

The system of FIG. 4 performs prewash, wash and rinse cycles in the manner described for the system of FIG. 2. This includes the replenishment of liquid carbon dioxide to the system from transfer tank 412, transfer of liquid carbon dioxide between storage tank 418 and wash chamber 432 by compressor 414 and drain after a prewash cycle to an external still 438.

After the agitation of the second and final rinse cycle has been completed, the bottom of wash chamber 432 is connected to the inlet side of filter 470 by line 472. In addition, the inlet side of filter 470 is placed in communication with the head space of internal still 320 via lines 474, 476 and 478. The suction side of compressor 414 is connected to the head space of storage tank 418 via lines 482, 484 and 486. The discharge side of compressor 414 is connected to chamber 432 via lines 488, 492 and 494. Accordingly, compressor 414 extracts gas from tank 418 and uses it to pressurize chamber 432. This causes the liquid carbon dioxide in chamber 432 to flow through line 472, the inlet side of filter 470 and lines 474, 476 and 478 to the internal still 320 so that it is filled with liquid carbon dioxide at a pressure of approximately 650 to 690 psi. Once the still is filled, the remaining liquid carbon dioxide from chamber 432 is directed to the liquid side of storage tank 418 via lines 478 and 496.

As with the system of FIG. 2, the system of FIG. 4 next performs a spin cycle whereby the liquid remaining in the garments within chamber 432 is removed. This liquid is drained from chamber 432, filtered by filter 470 and returned to storage tank 418 by operation of compressor 414 and a gas recirculation/fluffing cycle is performed, all in the manner described for the system of FIG. 2.

The pressure within chamber 432 must be reduced to atmospheric before the cleaned garments may be removed therefrom. As described with respect to the system of FIG. 2, this is accomplished by connecting the head space of chamber 432 to the suction side of compressor 414 via lines 494, 484 and 486. The discharge side of the compressor is placed in communication with the head space of external still 438 by lines 488, 492 and 498. Compressor 414 withdraws gas from chamber 432 and delivers it to external still 438 until the latter is pressurized to approximately 800 psi.

Once the external still 438 is pressurized to the appropriate level, the head space of internal still 320 is placed in communication with chamber 432 via line 478. In addition, the carbon dioxide gas from compressor 414 is redirected to the liquid side of storage tank 418 via lines 492, 502 and 496. As result, the carbon dioxide gas enters the liquid in storage tank 418 until the pressure in the tank increases to approximately 650 to 690 psi. At this point, the chamber 432 has been depressurized to approximately 50 to 60 psi. As described for the system of FIG. 2, this remaining pressure in the chamber may be safely vented to the atmosphere so that the chamber may be opened and the garments removed therefrom.

Due to the connection between chamber 432 and internal still 320, as compressor 414 removes carbon dioxide gas from chamber 432, the pressure within still 320 is also reduced. Furthermore, when compressor 414 directs carbon dioxide gas removed from chamber 432 to the liquid side of tank 418, the liquid in the tank surrounding the internal still is warmed. Both occurrences cause the liquid carbon dioxide within internal still 320 to boil. As the liquid carbon dioxide in still 320 vaporizes, soil and dye residue is left behind inside the still shell. The carbon dioxide vapor is removed from internal still 320, travels through chamber 432 and ultimately arrives at storage tank 418 where it is condensed into the liquid carbon dioxide contained therein. Similar to external still 438, the residue may be removed from the bottom of internal still 320 by periodically opening valve 504 so that the residue is blasted out of line 506 due to the pressure remaining in still 320.

As illustrated in FIG. 4, the internal still 320 is surrounded by a cylindrical shroud 508. Preferably, as illustrated in FIG. 4, the shroud covers approximately the bottom half of internal still 320 and extends somewhat beneath it. Shroud 508 is preferably constructed of metal and is open at the top and bottom. The shroud improves the efficiency of the distillation process performed by internal still 320. More specifically, the warmer carbon dioxide gas from the chamber 432 and compressor 414 is directed by line portion 510 into the annular space defined between the exterior surface of the sidewall of internal still 320 and shroud 508 as it enters tank 418. This provides two benefits. First, the warmer carbon dioxide gas is concentrated around the internal still so that the still sidewall is more efficiently heated. Second, the shroud 508 generally separates the warm carbon dioxide gas, and the liquid warmed thereby, from the remaining liquid carbon dioxide in tank 418 until heat is removed therefrom by still 320. As a result, the remaining liquid carbon dioxide in tank 418 remains cooler.

The systems of FIGS. 2-4 feature a number of control valves. The operation of these valves may also be automated by the use of a microcomputer, process controller or similar device.

One aspect of the present invention is to provide a more economically viable system associated with landfills. In the absence of greater economic benefits to the owners and investors in landfills, the ability of landfills to assist in actual waste reduction is limited. It is therefore necessary to associate additional technologies to existing and future landfill sites and or MRFs (material recovery facility) to assure maximum use of the materials at the site that can be used in subsequent commercial processes. This use of available resources includes the addition of commercial systems to the recycling sites and the use of effluent gases in existing and developing commercial processes. The fact that in most jurisdictions recycling and landfill sites are closely aligned can assist in the improvement in landfill utilization, as the recycled materials (e.g., paper, plastic, and metals such as aluminum and steel) and the waste material (for the landfill) are already brought to a common area. For the purpose of this invention, a common site or a site shall be considered an area wherein collected gases can be transported without accessing or establishing non-piped (that is, transportation by means other then pipes and tubes that involved separate containerizing of gases and physical transport of the containers) substantial gas transportation systems for one or more of the gas products. For example, typical sites would have no more than a ten mile (18 km) distance separating gas venting from gas collection and gas compression and compressed gas (e.g., gas, liquid or supercritical liquid) from commercial process use and transport the gases over that distance through pipes and tubes.

Gases are vented from a waste site such as a landfill, and the gases are separated into at least three streams comprising a hydrocarbon stream, a carbon dioxide stream, and residue stream. In a preferred practice of the invention, at least a portion of the carbon dioxide stream and hydrocarbon stream are liquefied or converted to a supercritical liquid. In a preferred embodiment, at least some of the carbon dioxide gas stream (as a liquid or supercritical fluid) is used in a cleaning step, preferably a container cleaning steps, such as a polymer or metal cleaning step, and more preferably a polymer cleaning step in a polymer recycling process, and most preferably in a polymer cleaning step in a polymer recycling system where the cleaning is performed on-site at the waste site. The cleaning step may also be used in cleaning of "electronic waste," that is electronic equipment such as telephones, computers (PC's, Mac's, lap tops, hand-held, etc.), pagers, radios, VCR's, CD players, televisions, DVD players and other devices that may contain chip boards. The cleaning step may be used for any waste material that has organic or metal contaminants.

Particularly desirable and commercially effective on-site uses include, but are not limited to at least partially energy-independent processes (energy being provided by burning of a portion or all of the hydrocarbon gas stream to provide heat or ultimately electricity), carbon dioxide based cleaning processes, polymer recycling (especially including a carbon dioxide-based cleaning step), dry ice manufacture, and the like. Commercially available equipment is marketed that enables electrical generation from hydrocarbon gases (referred to as Gen-sets in the trade), often using boiler systems that are powered by combustion of the gas and drive generators. Commercial dry ice systems are available, and according to the present invention, those dry ice systems could be powered on site by electricity provided by burning of the hydrocarbon gases.

There are a number of related aspects of the invention that can be used separately or combined in various proportions to practice benefits of the present invention.

One aspect of the invention would require the performance of steps on site (within 18 km of the collections site or waste site where gases are generated) that enhance the economic benefits of maintaining and operating a landfill system, as opposed to merely providing a landfill site. Among the individual specific tasks that can be performed on site at the waste system could include one or more of the following, which is not intended to be totally inclusive. Such ancillary tasks, in addition to capturing the two primary revenue potential gas streams (e.g., the hydrocarbon stream and carbon dioxide stream), would include hydrogen production, carbon black production, carbon dioxide liquefaction, and other value enhancing material production processes directed towards an effluent stream.

Preferred technologies for use of on-site developed energy from the hydrocarbon gas stream from the landfill gas (LFG) include energy for compression of the gas streams, transport of the gas streams and other materials, electrolysis of water to produce hydrogen and oxygen in capturable forms at high purity, catalytic treatment of the gas streams to produce carbon black and/or hydrogen (e.g., see "Hydrogen from Natural Gas without Release of $CO_2$ to the Atmosphere" Gaudernack, Bjorn and Lynum, Stynar, 1996, Proceedings of the 11$^{th}$ World Hydrogen Energy Conference, Stuttgart, Germany, HYDROGEN ENERGY PROCESS XI, pages 511-23 and *Hydrogen Power: Theoretical and Engineering Solutions*, Hox, Ketil et al., 1998 Kluwer Academic Publishers, Netherlands, pp. 143-148, which references are incorporated herein by reference in their entirety for the disclosure of carbon black generation processes and hydrogen generation processes from hydrocarbon gas streams. Additional background information on reformation of hydrocarbons is provided by U.S. Pat. Nos. 5,648,582; 6,254,807; 6,402,989; 6,409,940; 6,458,334; and 6,488,907. These processes are specifically among the processes that can be used on-site or in piped connection to collected gases from the gas-generation sites as part of the practice of technologies within the scope of the present invention. The use of other known processes in combination with these processes can provide synergy with the individual processes or to the entire economic strategy. For example, infrared or ultraviolet treatments can be used in conjunction with the cleaning processes, and some of the energy for those treatments can be provided by burning gas streams or by exchanging gas streams with a separate commercial energy source for other available energy (e.g., electricity).

The landfill gas processing facility is preferably located near a landfill such that the transportation of landfill gases from the landfill to the facility is accomplished by means of a direct piping system without first compressing the landfill gases or having to truck the landfill gases from the landfill to the facility. Alternatively, it is also within the scope of the present invention to transport the landfill gases from the landfill to the facility if economically feasible. A gas collection system is positioned within the landfill and connects to the piping system. Such gas collection systems typically comprise a series of perforated pipes or conduits and are known in the art. An example of an entire system that can be positioned on site comprises the Land-Fill Gas (LFG) collection points and a main gas header to separate waste gases (that are then usually flared, although even this low energy fuel source could be used as energy within the system, even reducing existing polluting levels by cleaning the burnt/flared stream). The separated gas stream including the carbon dioxide and hydrocarbon gases is then treated in a system to separate the hydrocarbons gases and carbon dioxide (in this case shown as a pressure condensation unit or PCU). A portion of the hydrocarbon stream (primarily methane) is then sent to a further condensation unit (methane liquefier) and the carbon dioxide is sent to carbon dioxide liquefier ($CO_2$ Liquifier), preferably where energy from a natural gas generator (Genset) provided by burning a portion of the 'natural gas' (methane and/or other hydrocarbons) is used to drive the carbon dioxide liquefaction. Portions of the carbon dioxide stream (either directly from the carbon dioxide stream or from the liquefier) are shown to be directed towards a cleaning facility on site (e.g., in this example, a plastic recycling center). The liquefied carbon dioxide is shown as then stored in a $CO_2$ storage tank and liquefied methane is shown in a liquid natural gas (LNG) storage tank. Shipment or sale of these stored gases can be provided with a weighing station (Scale) where it can be loaded onto a $CO_2$ trailer or LNG trailer for shipping to more distal users. A fuel island is also shown for local use or tank filling with LNG, as with internal (site internal) cartage vehicles or transportation vehicles.

Upon collection, the landfill gas enters the facility as a single stream and is delivered to a pre-conditioning unit. Depending upon the selected landfill or gas collection site, and also dependent on the stage at which the selected landfill or gas collection site is producing landfill gas, the composition of the landfill gas may vary. Generally, the landfill gas has about an equal composition of both methane and carbon dioxide, along with a minimal amount of nitrogen and trace amounts of other gases. It should be understood, however, and as is known in the art, that there may be substantial fluctuations in the composition of the landfill gas, and that such fluctuations are well within the scope of the present invention.

The pre-conditioning unit separates the landfill gas into a first stream substantially comprising methane, and a second stream substantially comprising carbon dioxide. By substantially comprising it is meant that the dominant component of each stream comprises at least about 90% of the respective stream, by volume. If the composition of the methane stream contains a minimum amount of methane to provide adequate energy upon combustion, a fuel stream is fed from the methane stream to an electrical generator capable of being powered by the combustion of the methane. The electrical generator is provided to generate a minimum amount of electricity to power the facility and any action taking place within the facility, including the collection of the landfill gases, vehicle travel within or near the site, making the facility self-reliant, independent of outside power sources. Thus, the minimum amount of methane needed to provide adequate energy to the facility is dependent upon the size of the facility and the type of electrical generator being used. If the composition of the methane stream is not great enough to provide adequate energy upon combustion for the electrical generator to power the facility, the methane stream must first be enriched. Flue gases from the electrical generator can be vented to the atmosphere or routed back through the pre-conditioning unit to separate unspent methane and carbon dioxide. Scrubbers can be added to remove other combustion gases, including nitrous oxides and carbon monoxides.

Regardless if upon exiting the pre-conditioning unit the methane stream is suitable for combustion within the electrical generator, in most situations the methane stream will have to be enriched in order to match the quality of natural gas obtained by more conventional methods. The methane stream connects to a methane enriching unit, which is positioned downstream from the pre-conditioning unit. The methane enriching unit further enhances the methane properties of the methane stream by separating out non-methane components, including carbon dioxide, nitrogen and other trace components. Upon exiting the methane enriching unit, the enriched methane stream preferably has a methane content of about 97%, by volume. An exemplary composition of the enriched methane stream is listed in Table 4.

TABLE 4

| % By Volume | Material |
|---|---|
| 98% | Methane |
| 0.5% | Oxygen |
| 0.3% | Nitrogen |
| 0.2% | $CO_2$ |
| 1.0% | Other |

At this concentration, the methane is suitable for most industrial applications. The enriched methane is then either left in a gaseous state or condensed to compressed natural gas or liquid natural gas for further processing. It is desirable to have low oxygen content in this enriched methane stream. This can be accomplished by the use of semi-permeable membranes or absorptive materials that selectively remove oxygen from the stream.

One such process is the production of carbon blacks, or gas black. Carbon blacks are used to reinforce rubber products such as tires and as reducing materials in metallurgic industries. Carbon blacks are an amorphous form of carbon particles formed by the thermal or oxidative decomposition of methane. A preferred process for forming the carbon blacks of the present invention includes the Kvaerner Carbon Black and Hydrogen Process, which produces both carbon black and hydrogen without emissions. The Kvaerner process is a plasma process for forming carbon blacks and hydrogen. However, other processes for forming carbon blacks are well within the scope of the present invention, including a channel black method, a lamp black method, a furnace black method and a thermal black method, all terms known in the art. Both the carbon blacks and the hydrogen can be sold wholesale as commodities.

In addition to carbon blacks, excess methane can be used in other processes to form hydrogen. One such process is steam methane reforming (SMR). In the SMR method, water in the form of steam is combined with methane to form hydrogen and carbon monoxide or other reforming processes. The carbon monoxide shifts to form carbon dioxide and hydrogen. The hydrogen can be captured and used to help generate power to heat the steam, with the excess being sold as a commodity. The steam may also be used for thermal heating at the facility by cycling the steam or condensed steam (hot water) through radiator pipes at the facility.

Also positioned downstream from the pre-conditioning unit is a condensing unit to liquefy the carbon dioxide stream. The carbon dioxide condensing unit connects to a storage tank wherein the liquified carbon dioxide is sent. From the storage tank, the liquified carbon dioxide can be sent to transportation tanks for sale in industrial uses. Alternatively, and more preferably, the liquid carbon dioxide is utilized on-site in the cleansing of substrate materials. In the practice of the present invention, both of these processes, as well as other processes, may be practiced on site.

Provided within or proximate the facility of the present invention is a cleaning apparatus. The cleaning apparatus utilizes liquid carbon dioxide to facilitate the removal of contaminants from the substrate materials. The preferred cleaning apparatus is similar to those fully described in U.S. Pat. Nos. 5,904,737, 6,216,302, 6,257,282, 6,349,947, and 6,442,980, all of which are hereby incorporated herein by reference. It should be noted, however, that other cleaning apparatuses, including those manufactured by Sailstar, Electrolux and Alliance are well within the scope of the present invention. Preferably, the substrate material includes plastics gathered from used or recycled containers. Such plastics include, but are not limited to, polyethylene (especially high density polyethylene "HDPE," low density polyethylene "LDPE"), polyethylene terephthalate (PET) and polyvinyl chloride (PVC). In many communities, the plastic containers are separated from refuse by consumers and are collected by recycling centers to be reprocessed into new forms. In other situations, the plastic containers are separated at the landfill, or even mined from within the landfill. Extraction of the contaminants, such as motor oil, from the containers typically results in acquiring two marketable products: recycled plastics and sometimes usable oil. The preferred extraction process is identical to that disclosed in U.S. Provisional Application 60/420,017, filed on Oct. 21, 2002 and entitled Extraction Process Utilizing Liquified Carbon Dioxide, which is hereby incorporated herein by reference. After extracting the oil from the substrate material, the plastics can sold in bulk to plastic processing facilities for reuse or even deposited within the landfill without the possible harm of contaminating the soil with oil. The oil extracted from the plastics is removed from the solvents, collected and may be sold as a commodity or as a fuel.

Alternatively, other extraction processes utilizing carbon dioxide are well within the scope of the present invention. Such process include, but are not limited to, the following: processes employing carbon dioxide as a solvent or co-solvent; processes employing liquid carbon dioxide as a solvent or co-solvent; processes employing super critical carbon dioxide as a solvent or co-solvent; and processes employing any combination of carbon dioxide, liquid carbon dioxide or super critical carbon dioxide as a solvent or co-solvent. In addition to the cleaning of plastics, the process of the present invention can be applied to other materials including, but not limited to, other refuse materials brought to be deposited into the landfill that contain contaminants capable of being removed by carbon dioxide, 'e-waste' such as boards and materials from computers, microprocessors, cellular phones, CRT monitors, and dry-cleaning facilities. The $CO_2$ cleaning processes that may be used with usable wastes in the practice of the invention may also be used in the cleaning of glass and ceramic surfaces, cleaning of paper and cardboard, recycling of paper or cardboard, and the general cleaning and recycling of materials. Glass is a particularly desirable surface to be cleaned in this manner as the treatment may both clean and polish glass surfaces. The materials generated according to the practice of the invention may also be used in water purification processes, water reclamation processes, water carbonation processes, and other processes where a source of carbon dioxide (in gas, liquid, supercritical liquid or solid form) can be used with immediate sources of inexpensive energy such as the energy from the gas turbine or other engines burning natural gases or hydrocarbon gases sourced from the natural gas sources as taught in the present invention.

It is important to recognize that the total economic potential of landfill systems, sewage treatment plants, fertilizer plants, and animal waste collection sites (which are collectively referred to herein generically as 'gas stream sites' or 'waste sites') have not been realized. In large part this is because there has been no consideration of the collective use of the waste streams. Even the pilot attempt described above in methanol conversion basically has provided little more than a break even economic flow in the production of methanol. It is therefore a benefit of the present system that multiple uses of multiple streams can be effected, rather than merely working one or two single streams for a narrow use. For example, the following combinations of processes can be combined in a single operating site. A single site is defined in the practice of the present invention where gas flows from the waste site are directly carried to the process streams through a direct piping stream. A direct piping stream would include addition of methane to a local gas stream (metering the input to the local stream) and withdrawing gas downstream for a process stream, the volume withdrawn for the process stream being compared to the addition volume to determine user costs and contributions.

The present invention may use the hydrocarbon gas stream to produce energy for multiple uses of both the hydrocarbon gas stream and the carbon dioxide stream, and by positioning recycling facilities or separation facilities adjacent the gas stream site, the energy and products of the at least three gas streams can be used in a more unified efficiency and provide significant economic improvement to the entire system. Considered in this perspective, the association of different processes as set forth below is more than a mere collection of dissimilar processes, but an integration of processes to maximize use of materials and economies.

One particularly desirable system would be establishing an apparel cleaning site proximal to the source of the at least three gas streams. Energy from burning a portion of the hydrocarbon can be used to power at least some of the energy requirements for carbon dioxide condensing/liquefaction, carbon dioxide-based apparel cleaning, recondensation/purification of the effluent stream of carbon dioxide from the apparel cleaning. The effluent carbon dioxide stream can be used, as described above, to stimulate hydrocarbon gas venting/collection/production in the gas stream site.

As a separate site or in addition to other process plants established using at least a portion of the at least three gas streams would be a polymer material recycling/cleaning/reforming system. The polymer cleaning system may include carbon dioxide cleaning of the polymeric materials, pelletizing of the clean solid polymer, and even molding or reforming of the pelletized polymer, using at least in-part energy from the burning of hydrocarbon gas from the at least three gas streams. Solvents may also be added to the carbon dioxide to assist in removing grease, oils, paints, labels and other materials that should not be recycled with the polymer. A preferred solvent system for removal of label stock in polymeric container recycling includes a mixture (5:95% by volume to 95-5% by volume) of at least one cosolvent selected from the group consisting of terpene alcohol, d-Limonene, and isoparaffinic hydrocarbons and at least a second cosolvent selected from the group consisting of C1-C6 alkyl lactates (especially C1, C2, C3 and C4 alkyl lactates, such as methyl lactate, ethyl lactate, propyl lactate and butyl lactate). Such materials are commercially available as a terpene alcohol based solvent such as environmentally safe Tarksol®, made by Tarksol, Inc., d-Limonene (Chemical Abstract Series No. 5989-27-5), or isoparaffinic hydrocarbon (Chemical Abstract Series No. 64742-48-9). These label cleaning cosolvent systems are proprietary to assignee and the subject of a U.S. Pat. No. 7,389,654. These solvents may be used on the label containing (preferably shredded) polymeric materials according to the teachings of U.S. Pat. No. 6,514,353, which teaches the use of only the first set of solvents as label removing materials. That patent is incorporated by reference for its teachings of solvent application processes, apparatus and materials.

D-limonene is known in certain cleansing solutions such as taught by Dotolo et al. (U.S. Pat. No. 5,346,652) describe a non-aqueous fingernail polish remover based upon a d-limonene, N-methylpyrrolidone (abbreviated NMP), and cetyl acetate solvent system. However, d-limonene is harmful if swallowed, can be irritating, causes drying, reddening, and sensitization of the skin, and is moderately to highly irritating to the eyes (MSDS, d-limonene, Florida Chemical Co., Inc., Winter Haven, Fla.). Similarly, Bayless (U.S. Pat. No. 5,372,742) describes a non-aqueous liquid cleaner suited for removing nail polish, based upon d-limonene, ethyl lactate, and cetyl acetate. The use of this novel cosolvent-based carbon dioxide, polymer-cleaning system (particularly for the removal of labels) is novel in its own right.

Although the present invention has been described with reference to preferred embodiments, workers skilled in the art will recognize that changes may be made in form and detail without departing from the spirit and scope of the invention.

The invention claimed is:

1. A method for removing contaminants from synthetic resin material comprising contacting particulate synthetic resin material containing at least one contaminant with an alkyl lactate solvent in a vessel, at least a portion of said at least one contaminant being removed from said particulate synthetic resin material and becoming dissolved in said solvent.

2. The method of claim 1 wherein said synthetic resin material is selected from the group consisting of polyethylene, high density polyethylene, low density polyethylene, polyethylene terephthalate, polyvinyl chloride and combinations thereof.

3. The method of claim 1 wherein said alkyl lactate is selected from the group consisting of methyl lactate, ethyl lactate, propyl lactate, butyl lactate and combinations thereof.

4. The method of claim 1 wherein said contacting step comprises sequentially contacting said particulate synthetic resin material with said solvent in at least two separate stages.

5. The method of claim 4 wherein said contacting step comprises sequentially contacting said particulate synthetic resin material in three separate stages.

6. The method of claim 1 including the step of removing at least a portion of said solvent from said particulate synthetic resin material.

7. A method for removing contaminants from synthetic resin material comprising the steps of:
(a) contacting particulate synthetic resin material containing at least one contaminant with a solvent other than carbon dioxide, at least a portion of said contaminant being removed from said particulate synthetic resin material and becoming dispersed in said solvent;
(b) removing at least a portion of said solvent from said particulate synthetic resin material; and
(c) contacting said particulate synthetic resin material with liquid carbon dioxide, at least a portion of said solvent not removed in step (b) being removed from said particulate synthetic resin material and becoming dissolved in said carbon dioxide.

8. The method of claim 7 wherein said synthetic resin material is selected from the group consisting of polyethylene, high density polyethylene, low density polyethylene, polyethylene terephthalate, polyvinyl chloride and combinations thereof.

9. The method of claim 7 wherein said alkyl lactate is selected from the group consisting of methyl lactate, ethyl lactate, propyl lactate, butyl lactate and combinations thereof.

10. The method of claim 7 wherein step (a) comprises sequentially contacting said particulate synthetic resin material with said solvent in at least two separate stages.

11. The method of claim 10 wherein step (a) comprises sequentially contacting said particulate synthetic resin material in three separate stages.

12. The method of claim 7 further including: (d) separating said carbon dioxide from said particulate synthetic resin material followed by separating said solvent removed in step (c) from said carbon dioxide.

13. The method of claim 12 further including: (e) purifying said solvent separated from said carbon dioxide in step (d) and recycling said purified solvent to step (a).

14. A system for removing contaminants from synthetic resin material comprising:
(a) at least one solvent vessel including therein a quantity of a liquid solvent other than carbon dioxide for contacting with said synthetic resin material;
(b) at least one mechanical separation device for removing at least a portion of said solvent from said synthetic resin material; and
(c) at least one carbon dioxide vessel including therein a quantity of liquid carbon dioxide for contacting said synthetic resin material and removing at least a portion of said solvent remaining on said synthetic resin material.

15. A method for removing contaminants from synthetic resin material comprising the steps of:
(a) contacting particulate synthetic resin material containing at least one contaminant with a liquid consisting essentially of a solvent other than carbon dioxide, at least a portion of said contaminant being removed from said particulate synthetic resin material and becoming dispersed in said liquid;
(b) removing at least a portion of said solvent from said particulate synthetic resin material; and
(c) contacting said particulate synthetic resin material with liquid or supercritical carbon dioxide, at least a portion of said solvent not removed in step (b) being removed from said particulate synthetic resin material and becoming dissolved in said carbon dioxide.

16. The method of claim 15 wherein said solvent is selected from the group consisting of methyl lactate, ethyl lactate, propyl lactate, butyl lactate, limonene and combinations thereof.

17. The method of claim 15 wherein said synthetic resin material is selected from the group consisting of polyethylene, high density polyethylene, low density polyethylene, polyethylene terephthalate, polyvinyl chloride and combinations thereof.

* * * * *